(12) United States Patent
Chang et al.

(10) Patent No.: US 11,423,700 B2
(45) Date of Patent: Aug. 23, 2022

(54) METHOD, APPARATUS, DEVICE AND COMPUTER READABLE STORAGE MEDIUM FOR RECOGNIZING AERIAL HANDWRITING

(71) Applicant: BEIJING BAIDU NETCOM SCIENCE AND TECHNOLOGY CO., LTD., Beijing (CN)

(72) Inventors: Minqiang Chang, Beijing (CN); Huan Ye, Beijing (CN); Xiang Xu, Beijing (CN); Zhe Peng, Beijing (CN); Guanbo Bao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 39 days.

(21) Appl. No.: 17/021,827

(22) Filed: Sep. 15, 2020

(65) Prior Publication Data
US 2020/0410222 A1     Dec. 31, 2020

Related U.S. Application Data

(63) Continuation of application No. PCT/CN2019/091261, filed on Jun. 14, 2019.

(30) Foreign Application Priority Data

Oct. 19, 2018 (CN) .......................... 201811222348.X

(51) Int. Cl.
*G06K 9/00* (2022.01)
*G06V 40/20* (2022.01)
(Continued)

(52) U.S. Cl.
CPC ............ *G06V 40/28* (2022.01); *G06K 9/6257* (2013.01); *G06T 7/246* (2017.01); *G06V 10/44* (2022.01);
(Continued)

(58) Field of Classification Search
CPC ............. G06K 9/00355; G06K 9/4604; G06K 9/6257; G06K 2209/013; G06T 7/246;
(Continued)

(56) References Cited

U.S. PATENT DOCUMENTS

2012/0105613 A1   5/2012   Weng et al.
2015/0253864 A1   9/2015   Parkhomenko et al.
(Continued)

FOREIGN PATENT DOCUMENTS

CN     102520790 A    6/2012
CN     103577843 A    2/2014
(Continued)

OTHER PUBLICATIONS

Qu, Xiwen, et al. "Data augmentation and directional feature maps extraction for in-air handwritten Chinese character recognition based on convolutional neural network." Pattern Recognition Letters 111 (2018): 9-15. (Year: 2018).*
(Continued)

*Primary Examiner* — Jonathan S Lee
(74) *Attorney, Agent, or Firm* — Lathrop GPM LLP

(57) ABSTRACT

A method, an apparatus, a device and a computer-readable storage medium for recognizing aerial handwriting are provided. The method may include detecting a palm region of a user in a two-dimensional grayscale image; detecting a fingertip in the two-dimensional gray-scale image based on the palm area; determining a spatial trajectory of the fingertip based on a set of two-dimensional gray-scale images, the set of two-dimensional gray-scale images including the two-dimensional gray-scale image; and recognizing handwritten content of the user based on the spatial trajectory. A two-dimensional gray-scale image is used to recognize and track the spatial trajectory of the fingertip, which may speed up aerial handwriting recognition, and has low processing
(Continued)

performance requirements for the device, while also ensuring high accuracy.

17 Claims, 5 Drawing Sheets

(51) Int. Cl.
  *G06T 7/246* (2017.01)
  *G06K 9/62* (2022.01)
  *G06V 10/44* (2022.01)
  *G06V 30/28* (2022.01)

(52) U.S. Cl.
  CPC ............ *G06T 2207/10024* (2013.01); *G06T 2207/20081* (2013.01); *G06T 2207/20084* (2013.01); *G06V 30/293* (2022.01)

(58) Field of Classification Search
  CPC . G06T 2207/10024; G06T 2207/20081; G06T 2207/20084
  USPC ........................................................ 382/103
  See application file for complete search history.

(56) References Cited

U.S. PATENT DOCUMENTS

2017/0192513 A1* 7/2017 Karmon ................ G06V 40/28
2019/0102044 A1* 4/2019 Wang .................... H04N 5/232

FOREIGN PATENT DOCUMENTS

| CN | 104834922 A | 8/2015 |
| CN | 105320248 A | 2/2016 |
| CN | 105718878 A | 6/2016 |
| CN | 106022392 A | 10/2016 |
| CN | 106951871 A | 7/2017 |
| CN | 107945210 A | 4/2018 |
| CN | 109344793 A | 2/2019 |
| WO | WO 2016056260 A1 | 4/2016 |

OTHER PUBLICATIONS

Chang, Hyung Jin, et al. "Spatio-temporal hough forest for efficient detection—localisation—recognition of fingerwriting in egocentric camera." Computer Vision and Image Understanding 148 (2016): 87-96. (Year: 2016).*

Kumar, Pradeep, et al. "Study of text segmentation and recognition using leap motion sensor." IEEE Sensors Journal 17.5 (2016): 1293-1301. (Year: 2016).*

Choi, Ouk, et al. "Co-recognition of multiple fingertips for tabletop human—projector interaction." IEEE Transactions on Multimedia 21.6 (2018): 1487-1498. (Year: 2018).*

Sun, Xiao, et al. "Cascaded hand pose regression." Proceedings of the IEEE conference on computer vision and pattern recognition. 2015. (Year: 2015).*

European Patent Application No. 19874000.3, extended European Search Report dated Oct. 26, 2021, 7 pages.

International Patent Application No. PCT/CN2019/091261; International Search Report and Written Opinion dated Aug. 17, 2019; 9 pgs.

* cited by examiner

METHOD, APPARATUS, DEVICE AND COMPUTER READABLE STORAGE MEDIUM FOR RECOGNIZING AERIAL HANDWRITING

CROSS-REFERENCE TO RELATED APPLICATIONS

This application is a continuation of International Application No. PCT/CN2019/091261, filed on Jun. 14, 2019, which claims priority to Chinese Patent Application No. 201811222348.X, filed on Oct. 19, 2018. The disclosures of the aforementioned applications are hereby incorporated by reference in their entireties.

TECHNICAL FIELD

Embodiments of the present disclosure relate generally to the field of image processing, and more particularly, to a method, apparatus, device, and computer-readable storage medium for recognizing aerial handwriting.

BACKGROUND

With the rapid development of mobile Internet and artificial intelligence technology, more and more electronic devices have image acquisition and recognition capabilities. For example, smartphones typically have a front-facing camera and a rear-facing camera that can be used to capture images for image presentation and/or recognition processing. In addition to smart phones, smart terminals such as smart wearable devices (such as smart watches) and smart home devices (such as smart televisions) may also be provided with a camera capable of capturing images.

In general, the characters may be input to the device by means of a physical keyboard or a virtual keyboard, and in addition, the characters may be input by handwriting, for example, flat writing on a touch screen or a touch pad surface. Flat writing requires the user to use the hand or pen to touch the touch surface and thus the user experience is not good. A new handwriting method is aerial handwriting, such as handwriting in the air. Aerial writing can provide a free three-dimensional writing space to the user, thereby providing a better user experience.

SUMMARY

In accordance with example embodiments of the present disclosure, a method, apparatus, device, and computer-readable storage medium for recognizing aerial handwriting are provided.

In a first aspect of the present disclosure, a method for recognizing aerial handwriting is provided. The method includes detecting a palm area of a user in a two-dimensional gray-scale image; detecting a fingertip in the two-dimensional gray-scale image based on the palm are; determining a spatial trajectory of the fingertip based on a set of two-dimensional gray-scale images, wherein the set of two-dimensional gray-scale images includes the two-dimensional gray-scale image; and recognizing the handwritten content of the user based on the spatial trajectory.

In a second aspect of the present disclosure, an apparatus for recognizing aerial handwriting is provided. The apparatus includes a palm determination module configured to detect a palm area of a user in a two-dimensional gray-scale image; a fingertip detection module configured to detect a fingertip in a two-dimensional gray-scale image based on the palm area; a trajectory tracking module configured to determine a spatial trajectory of the fingertip based on a set of two-dimensional gray-scale images, where the set of two-dimensional gray-scale images includes the two-dimensional gray-scale image; and a track recognition module configured to recognize the handwritten content of the user based on the spatial trajectory.

In a third aspect of the present disclosure, an electronic device that includes one or more processors and storage means for storing one or more programs is provided. One or more programs, when executed by one or more processors, cause the electronic device to implement a method or process according to an embodiment of the present disclosure.

In a fourth aspect of the present disclosure, there is provided a computer readable storage medium storing a computer program that, when executed by a processor, implements a method or process according to an embodiment of the present disclosure.

It is to be understood that is the content described in the Summary section of the disclosure is not intended to limit the critical or critical features of embodiments of the disclosure, nor is it intended to limit the scope of the disclosure. Other features of the present disclosure will become readily apparent from the following description.

BRIEF DESCRIPTION OF THE DRAWINGS

The above and other features, advantages and aspects of embodiments of the present disclosure will become more apparent from the following detailed description in conjunction with the accompanying drawings. In the drawings, the same or similar reference numerals denote the same or similar elements.

DETAILED DESCRIPTION OF EMBODIMENTS

Figure 1:
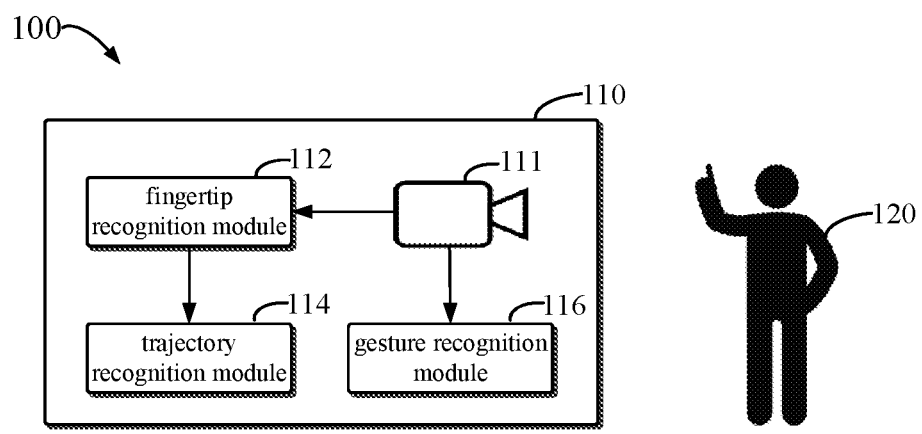
FIG. 1 illustrates a schematic diagram of an example environment for recognizing aerial handwriting according to an embodiment of the present disclosure.

Embodiments of the present disclosure will be described in more detail below with reference to the accompanying drawings. While certain embodiments of the disclosure have been shown in the drawings, it is to be understood that the disclosure may be embodied in various forms and should not be construed as limited to embodiments set forth herein, but rather is provided for a more thorough and complete understanding of the disclosure. It is to be understood that the drawings and examples of the present disclosure are for illustrative purposes only and are not intended to limit the scope of protection of the disclosure.

In the description of the embodiments of the present disclosure, the term "comprising" and its analogous terms are to be understood as open-ended, i.e., "including, but not limited to." The term "based on" is to be understood as "based at least in part on. The term "one embodiment" or "the embodiment" is to be understood as "at least one embodiment". The term "some embodiments" is to be understood as "at least some embodiments." Other explicit and implicit definitions may also be included below.

Conventionally, in order to realize recognition of aerial handwriting, it is generally necessary to use a depth image or a color image acquired by a camera, and to recognize an aerial handwriting trajectory based on processing of the depth image or the color image. The implementation of depth images generally requires dedicated cameras or camera arrays, which may not be arranged on electronic devices of consumers in general. Color images, due to the presence of multi-channel information, have slow recognition processing speeds, and can cause large processing burdens and slow speeds for devices with limited processing capabilities such as smart watches and smart home devices.

Embodiments of the present disclosure propose a scheme for recognizing aerial handwriting. In embodiments of the present disclosure, a two-dimensional gray-scale image is used to recognize and track the spatial trajectory of the fingertip, the processing speed of the two-dimensional gray-scale image is generally faster, thus enabling faster handwriting recognition in the air, requiring lower processing performance of the device, and ensuring high accuracy. In addition, the aerial handwriting recognition scheme of the present disclosure can be used not only for character input of an input method, but also for intelligent interaction and/or input of other electronic devices.

In addition, in some embodiments of the present disclosure, computation for detection can be reduced and the computation speed can be improved by using a bounding box tracking method in a fingertip recognition and/or gesture recognition process. In addition, in some embodiments of the present disclosure, the conventional 8-direction feature detection is combined with a deep neural network (DNN), so that the accuracy of trajectory recognition can be improved. Some example implementations of the present disclosure will be described in detail below with reference to FIGS. 1-7.

FIG. 1 illustrates a schematic diagram of an example environment 100 for recognizing aerial handwriting according to an embodiment of the present disclosure. In the environment 100, the electronic device 110 may be in a handwriting detection state, where the electronic device includes a camera 111 (which may be, for example, a monocular camera or the like). The electronic device 110 further includes a fingertip recognition module 112 for obtaining a spatial trajectory of the fingertip, a trajectory recognition module 114 for recognizing the spatial trajectory, and a gesture recognition module 116 for recognizing a gesture type. It should be understood that the electronic device 110 may be any electronic device having a camera function, such as a smartphone, a notebook computer, a smart watch, a smart television, a smart speaker, etc., and the camera 111 may be a built-in camera or an external camera.

The electronic device 110 may be configured to be in a handwriting detection state when a handwriting input needs to be received. The camera 111 of the electronic device 110 performs a detection for a picture within its shooting range, for example, the camera 111 is detecting for the aerial handwriting of the user 120 in the environment 100. Next, the image acquired by the camera 111 is transmitted to the gesture recognition module 116, after the gesture recognition module 116 detects the start gesture, the fingertip recognition module 112 may start to detect the spatial trajectory of the fingertip of the user, and the trajectory recognition module 114 recognizes the detected spatial trajectory to determine the handwritten content of the user. The fingertip recognition module 112 according to an embodiment of the present disclosure uses a two-dimensional gray-scale image to recognize and track the spatial trajectory of the fingertip, which can speed up aerial handwriting recognition, and has low processing performance requirements for the device, while also ensuring high accuracy.

Figure 2:
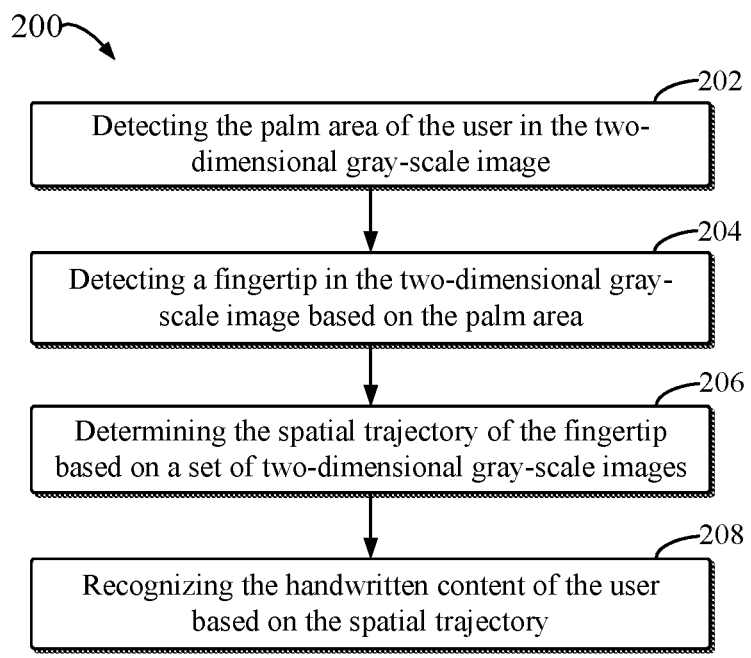
FIG. 2 illustrates a flow diagram of a method for recognizing aerial handwriting according to an embodiment of the present disclosure.

FIG. 2 illustrates a flow diagram of a method 200 for recognizing aerial handwriting according to an embodiment of the present disclosure. It should be understood that the method 200 according to an embodiment of the present disclosure may be performed by the electronic device 110 described in FIG. 1. Aerial handwriting refers to a writing method in which the fingertip does not touch the touch screen or the touch pen, and a corresponding character can be recognized by tracking a writing trajectory of the fingertip of the user in the air.

At block 202, the palm area of the user in the two-dimensional gray-scale image is detected. For example, the fingertip recognition module 112 may convert the two-dimensional color image acquired by the camera 111 of the electronic device 110 into a two-dimensional grayscale (e.g., gray) image, and since the calculation amount of the gray-scale image is smaller than that of the depth image or the color image and the requirement for the device is lower, the detection speed of the fingertip trajectory can be increased.

At block 204, a fingertip in the two-dimensional gray-scale image is detected based on the palm area. For example, the fingertip recognition module 112 detects fingertip key points in the two-dimensional gray-scale image after extracting the palm area.

At block 206, the spatial trajectory of the fingertip is determined based on a set of two-dimensional gray-scale images, where the set of two-dimensional gray-scale images includes the two-dimensional gray-scale image of the first frame. For example, the fingertip recognition module 112 further recognizes and tracks the moving trajectory of the fingertip in the air through a plurality of two-dimensional gray-scale images. At block 208, the handwritten content of the user is recognized based on the spatial trajectory. For example, the trajectory recognition module 114 recognizes corresponding characters, which may be Chinese characters, letters, symbols, etc., based on the determined spatial trajectories. Thus, the method 200 according to an embodiment of the present disclosure can increase the speed of aerial handwriting recognition by using a two-dimensional gray-scale image to recognize and track the spatial trajectory of the fingertip.

Figure 3:
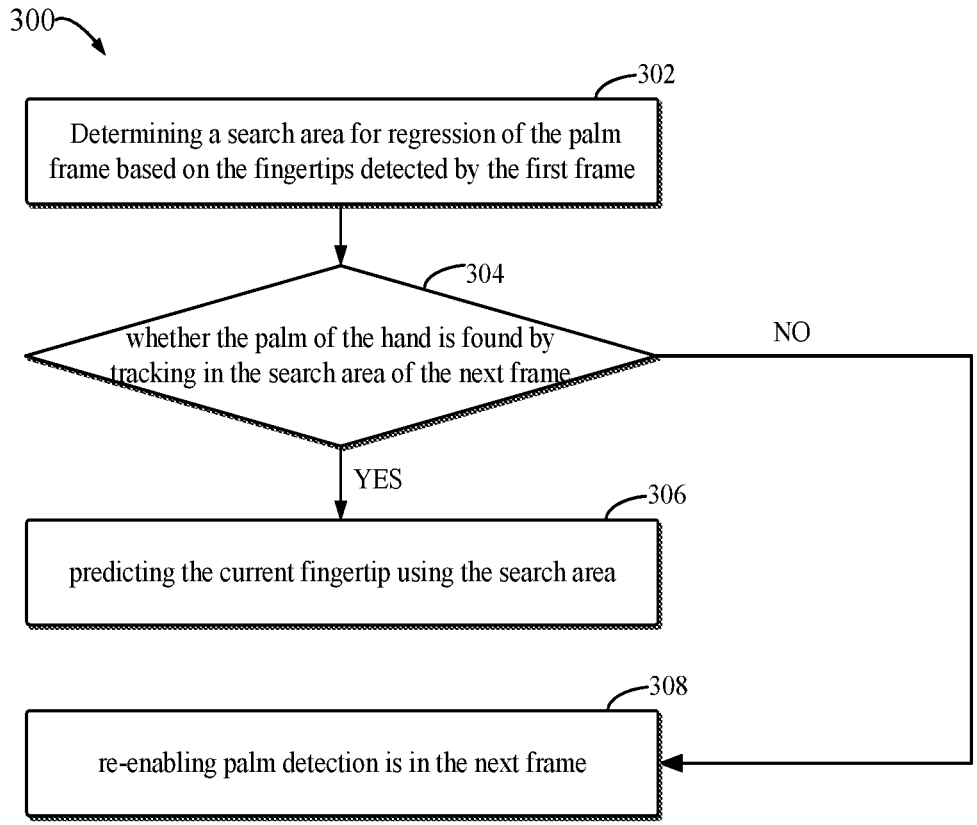
FIG. 3 illustrates a flow diagram of a method for fingertip recognition according to an embodiment of the present disclosure.

FIG. 3 illustrates a flow diagram of a method 300 for fingertip recognition according to an embodiment of the present disclosure. It should be understood that the method 300 according to an embodiment of the present disclosure may be performed by the fingertip recognition module 112 in the electronic device 110 described in FIG. 1, and that the method 300 may be implemented as an example of step 206 of the method 200 described above with reference to FIG. 2.

At block 302, a search area for regression of the palm frame is determined based on the fingertips detected by the first frame. For example, for the first frame, the palm detection is used to extract the palm frame, then a fingertip keypoint detection is performed, and the regression of the palm frame is performed to generate a search area for subsequent tracking.

At block 304, whether the palm of the hand is found by tracking in the search area of the next frame (e.g., the second frame) is determined. If it is determined at block 304 that the palm is found by tracking in the search area of the next frame, then at block 306, the current fingertip is predicted using the search area, i.e., the current position of the fingertip is determined based on the search area. If it is determined at block 304 that the palm is not found by tracking in the search area of the next frame, then the palm is lost, and thus palm detection is re-enabled in the next frame at block 308. Tracking is used and an approximate palm area is acquired by regression for subsequent tracking, avoiding the need to detect the palm area for each frame, thereby reducing computation and increasing execution speed.

In some embodiments, DNN may be used to detect fingertips in a two-dimensional gray scale image, where DNN is trained using information of consecutive image frames. Since information for consecutive frames is used, the fingertip detection results are more stable in the video. In some embodiments, an optical flow scheme may also be used to make the trajectory recognition of the fingertips more continuous and stable. The training of the DNN may include the following three aspects. First, the palm area is cut by using the palm frame, and the key point of the fingertip is detected, while regression of the current palm frame is performed. Next, after the training of the palm area and the fingertip is basically converged, consecutive frames are used for training to improve the stability of the key points of the fingertip. The classifier is then trained to determine whether the palm is included in the currently predicted palm frame for subsequent tracking determination. Thus, embodiments of the present disclosure can obtain gradient features of the fingertip through deep learning, directly performing regression of the fingertips without requiring conventional depth map information or thermal map information, and without requiring palm detection to be performed for each frame of image.

Figure 4:
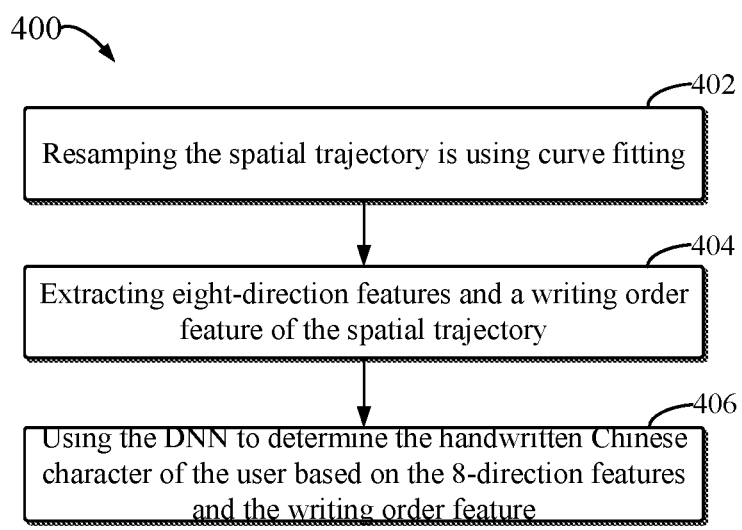
FIG. 4 illustrates a flow diagram of a method for trajectory recognition according to an embodiment of the present disclosure.

FIG. 4 illustrates a flow diagram of a method 400 for trajectory recognition according to an embodiment of the present disclosure. It should be understood that the method 400 according to an embodiment of the present disclosure may be performed by the trajectory recognition module 114 in the electronic device 110 described in FIG. 1, and the method 400 may be implemented as an example of step 208 of the method 200 described above with reference to FIG. 2.

At block 402, the spatial trajectory is resampled using curve fitting. At block 404, eight-direction features and a writing order feature of the spatial trajectory are extracted. For example, a curve fitting method may be used for resampling, and eight-direction features may be directly obtained by deriving, thereby obtaining more accurate eight-direction features. In addition, a timing feature may be added to represent the order in which the user writes instead of the simple eight-direction features. Alternatively, the spatial characteristics of the Chinese characters may be defined artificially. However, the spatial characteristics of the Chinese characters may not be defined artificially, and the spatial characteristics and the timing characteristics are both learned by means of a neural network. At block 406, the DNN is used to determine the handwritten Chinese character of the user based on the 8-direction features and the writing order feature.

Conventionally, trajectories are generally recognized using 8-direction feature extraction and template matching, Naive Bayes, or a hybrid combination of classifiers, or a combination of 8-direction features and a convolutional neural network (CNN). However, the CNN approach generally involves only spatial features and discards timing information of writing characters such as Chinese characters. On the contrary, embodiments of the present disclosure can solve the problem that the CNN cannot describe the writing order of the user by replacing the conventional CNN or the like with the DNN (which includes, for example, a full-connected network of five layers).

Figure 5:
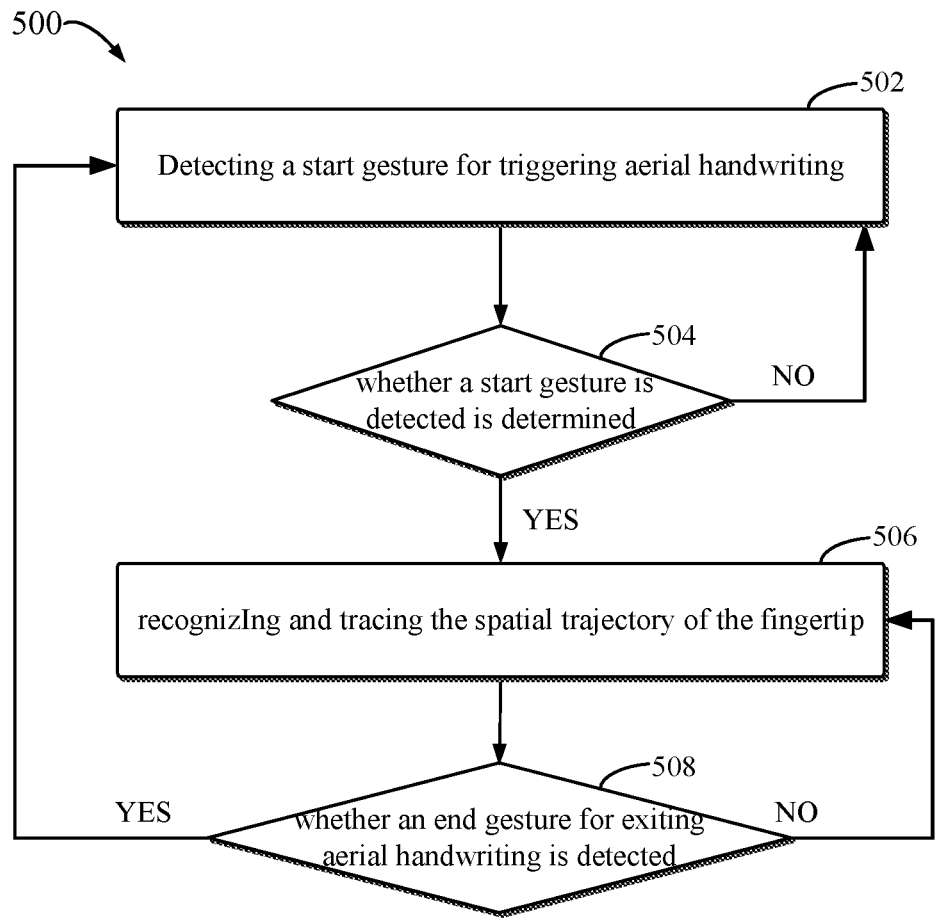
FIG. 5 illustrates a flowchart of a method for gesture recognition according to an embodiment of the present disclosure.

FIG. 5 illustrates a flow diagram of a method 500 for gesture recognition according to an embodiment of the present disclosure. It should be understood that the method 500 according to an embodiment of the present disclosure may be performed by the gesture recognition module 116 in the electronic device 110 described in FIG. 1, and the method 500 may be performed before, after, or substantially simultaneously with the method 200 described above with reference to FIG. 2.

At block 502, a start gesture for triggering aerial handwriting is detected. For example, the gesture recognition module 116 performs a detection for the start gesture periodically or according to a predetermined rule. It should be understood that although the user hand can also be detected by the two-dimensional gray image, the color image detection of the user hand is more accurate, and misjudgment of light shading of a non-hand area can be reduced. Therefore, some embodiments of the present disclosure use the two-dimensional color image acquired by the camera 111 to detect the user hand, thereby recognizing the user gesture type. At block 504, whether a start gesture is detected is determined. After detecting the hand, the features of the hand may be extracted to make a classification assignment, for example, if it is recognized that the current gesture is a single finger pointing down, indicating the start of aerial handwriting.

If the start gesture is not detected at block 504, the method is returned to block 502 to continue to periodically perform detection for the start gesture. If the start gesture is detected at block 504, then at block 506, the fingertip recognition module 112 may begin to operate and recognize the spatial trajectory of the fingertip.

At block 508, whether an end gesture for exiting aerial handwriting is detected is determined. If no end gesture is detected at block 508, the method is returned to block 506 to continue to recognize and track the spatial trajectory of the fingertip. If the end gesture is detected at block 508, it indicates that the user indicates the end of writing, the detection of handwriting recognition is stopped, and the method is returned to 502 to continue to periodically perform detection for the handwriting start gesture.

In some embodiments, a bounding box for regressing the hand may be determined based on the detected hand. In a case where a hand is found by tracking in the bounding box of a second color image after the first color image, a gesture type of a user is determined based on the bounding box; and in the case where no hand is found by tracking in the bounding box of the second color image, the detection of the hand is started in the second color image.

For example, for the hand detection, the image features in the picture may be extracted based on the image recognition of the CNN neural network scheme, and then the regression calculation is performed to determine whether the current frame has the hand and the position of the hand. Hand detection is usually performed only for the first frame, and when the hand is lost, the next detection is performed. A binomial judgment is performed on the hand, and if the hand image detected or tracked in each frame is not the hand, the detection is performed again. For example, binomial training of the hand may be performed in an on-line sample mining manner. In addition, hand tracking may be performed in the form of a frame to track the hand moving in the image sequence. That is, after the hand detection is completed successfully, the tracking network may be operated to obtain the binomial classification of the hand, the bounding box area, and the gesture type. If the tracked object is the hand, the tracking calculation continues with the image of the next frame extracted from the bounding box of the current frame. If the tracked object is not the hand, the hand detection operation is performed again.

Thus, by means of tracking, embodiments of the present disclosure avoid detecting the user hand in each frame, thereby increasing the execution speed. That is, the amount of calculation of the device can be reduced by combining the detection and tracking of gestures through adding the binomial classification determination and the regression bounding box.

Figure 6:
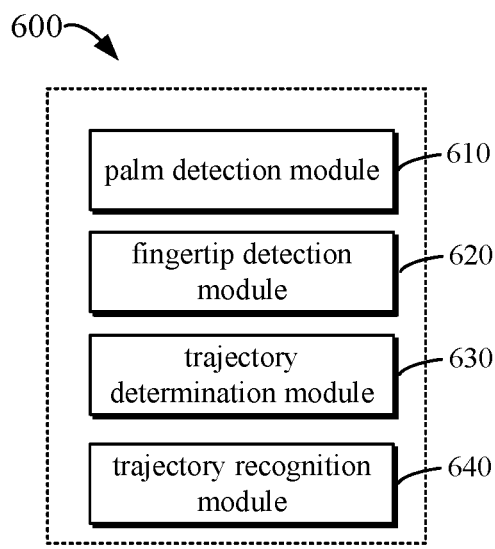
FIG. 6 illustrates a block diagram of an apparatus for recognizing aerial handwriting according to an embodiment of the present disclosure.

FIG. 6 illustrates a block diagram of an apparatus 600 for recognizing aerial handwriting according to an embodiment of the present disclosure. As shown in FIG. 6, the apparatus 600 includes a palm detection module 610, a fingertip detection module 620, a trajectory determination module 630, and a trajectory recognition module 640. The palm detection module 610 is configured to detect a palm area of a user in a two-dimensional gray-scale image, the fingertip detection module 620 is configured to detect a fingertip in the two-dimensional gray-scale image based on the palm area, the trajectory determination module 630 is configured to determine a spatial trajectory of the fingertip based on a set of two-dimensional gray-scale images, where the set of two-dimensional gray-scale images includes the two-dimensional gray-scale image, and the trajectory recognition module 640 is configured to recognize handwritten content of the user based on the spatial trajectory.

In some embodiments, the palm detection module 610 includes an acquisition module configured to acquire a two-dimensional color image through a camera of an electronic device; and a generation module configured to generate a two-dimensional gray image by graying the two-dimensional color image.

In some embodiments, the fingertip detection module 620 includes a neural network detection module configured to detect fingertips in a two-dimensional gray scale image using a depth neural network, where the depth neural network is trained using information of consecutive image frames.

In some embodiments, the two-dimensional grayscale image is a first grayscale image, the set of two-dimensional grayscale images further includes a second grayscale image temporally following the first grayscale image, and the trajectory determination module 630 includes a search area determination module configured to determine a search area for regression of the palm frame based on the detected fingertips; a first response module configured to determine a current position of the fingertip based on the search area in response to finding the palm by tracking in the search area in the second gray-scale image; and a second response module configured to perform palm detection in the second gray image in response to not finding the palm by tracking in the search area in the second gray image.

In some embodiments, apparatus 600 further includes a gesture recognition module configured to recognize a gesture type of a user in response to detecting a hand of the user in a first color image acquired by a camera, the gesture type including at least a start gesture for triggering aerial handwriting and an end gesture for exiting aerial handwriting.

In some embodiments, the gesture recognition module includes an enclosure area determination module configured to determine an enclosure area for regressing the hand based on the detected hand; a third response module configured to determine a gesture type of a user based on the enclosure area in response to finding a hand by tracking in the enclosure area in the second color image after the first color image; and a fourth response module configured to perform hand detection in the second color image in response to not finding the hand by tracking in the enclosure area in the second color image.

In some embodiments, the trajectory recognition module includes a feature extraction module configured to extract eight-direction features and a writing order feature of the spatial trajectory; a neural network recognition module configured to determine a handwritten Chinese character of a user using a depth neural network based on the eight-direction features and the writing order feature.

In some embodiments, the feature extraction module includes a resampling module configured to resample the spatial trajectory using curve fitting; and a second feature extraction module configured to extract the eight-direction features based on the resampled spatial trajectory.

It should be understood that the palm detection module 610, the fingertip detection module 620, and the trajectory determination module 630 shown in FIG. 6 may be included in the fingertip recognition module 112 shown in FIG. 1, and the trajectory recognition module 640 may be the trajectory recognition module 114 shown in FIG. 1. Moreover, it should be understood that the modules shown in FIG. 6 may perform steps or acts in the methods or processes with reference to embodiments of the present disclosure.

Figure 7:
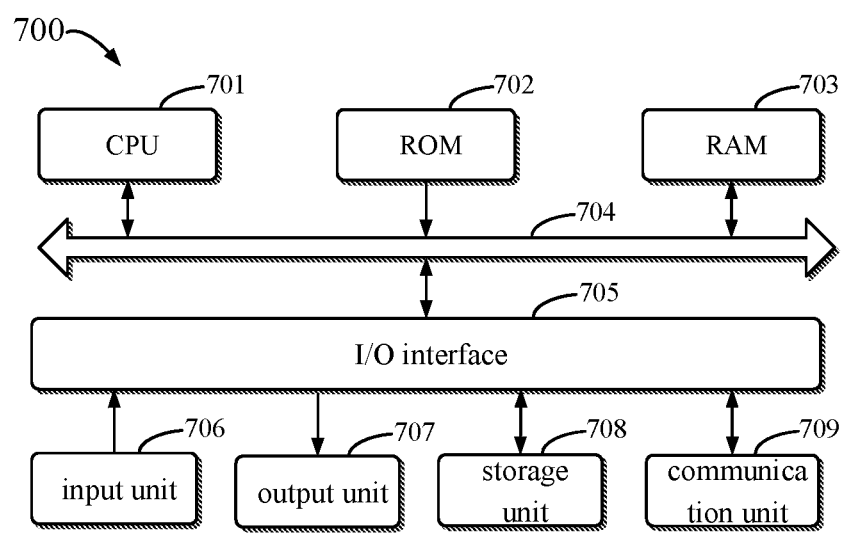
FIG. 7 illustrates a block diagram of an electronic device capable of implementing various embodiments of the present disclosure.

FIG. 7 shows a schematic block diagram of an example device 700 that may be used to implement embodiments of the present disclosure. It should be understood that device 700 may be used to implement an apparatus 600 or electronic device 110 for recognizing aerial handwriting as described in the present disclosure. As shown, the apparatus 700 includes a central processing unit (CPU) 701, which may perform various appropriate actions and processes according to computer program instructions stored in a read-only memory (ROM) 702 or computer program instructions loaded into a random access memory (RAM) 703 from a storage unit 708. In RAM 703, various programs and data required for operation of the device 700 may also be stored. CPU 701, ROM 702, and RAM 703 are connected to each other via a bus 704. An input/output (I/O) interface 705 is also connected to bus 704.

A plurality of components in the device 700 are connected to the I/O interface 705, including an input unit 706, such as a keyboard, a mouse, and the like; an output unit 707, for example, various types of displays, speakers, and the like; a storage unit 708, such as a magnetic disk, an optical disk, or the like; and a communication unit 709, such as a network card, a modem, or a wireless communication transceiver. The communication unit 709 allows the device 700 to exchange information and/or data with other devices over a computer network such as the Internet and/or various telecommunications networks.

The processing unit 701 performs the various methods and processes described above, such as the methods 200-500. For example, in some embodiments, the method may be implemented as a computer software program tangibly embodied in a machine-readable medium, such as a storage unit 708. In some embodiments, some or all of the computer program may be loaded and/or installed on the device 700 via the ROM 702 and/or the communication unit 709. When the computer program is loaded into the RAM 703 and executed by the CPU 701, one or more acts or steps of the method described above may be performed. Alternatively, in other embodiments, the CPU 701 may be configured to perform the method by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for recognizing aerial handwriting, comprising:
   detecting a palm area of a user in a two-dimensional gray-scale image;
   detecting a fingertip in the two-dimensional gray-scale image based on the palm area;
   determining a spatial trajectory of the fingertip based on a set of two-dimensional gray-scale images, the set of two-dimensional gray-scale images including the two-dimensional gray-scale image; and
   recognizing handwritten content of the user based on the spatial trajectory,
   wherein the two-dimensional gray-scale image is a first gray-scale image, the set of two-dimensional gray-scale images further comprises a second gray-scale image temporally following the first gray-scale image, and
   the determining a spatial trajectory of the fingertip comprises:
   tracking in a search area, determined for regressing a palm frame based on the detected fingertip, in the second gray-scale image, for determining whether the search area comprises the palm, so as to determine the spatial trajectory of the fingertip.

2. The method of claim 1, wherein the detecting a palm area of a user in a two-dimensional gray scale image comprises:
   acquiring a two-dimensional color image through a camera of an electronic device; and
   generating the two-dimensional gray image by graying the two-dimensional color image.

3. The method of claim 1, wherein the detecting a fingertip in the two-dimensional gray scale image comprises:
   detecting a fingertip in the two-dimensional gray-scale image using a depth neural network, the depth neural network being trained using information of consecutive image frames.

4. The method of claim 1, wherein determining the spatial trajectory of the fingertip further comprises:
   determining a current position of the fingertip based on the search area in response to determining that the search area comprises the palm; and
   performing palm detection in the second gray image in response to determining that the search area does not comprise the palm.

5. The method of claim 1, further comprising:
   recognizing a gesture type of the user in response to detecting a hand of the user in a first color image acquired by a camera, the gesture type including at least a start gesture for triggering the aerial handwriting and an end gesture for exiting the aerial handwriting.

6. The method of claim 5, wherein the recognizing a gesture type of the user comprises:
   determining an enclosure area for regressing the hand based on the detected hand;
   determining the gesture type of the user based on the enclosure area in response to finding the hand by tracking in the enclosure area in a second color image following the first color image; and
   performing hand detection in the second color image in response to not finding the hand by tracking in the enclosure area in the second color image.

7. The method of claim 1, wherein the recognizing the handwritten content of the user comprises:
   extracting eight-direction features and a writing order feature of the spatial trajectory;
   determining a handwritten Chinese character of the user using a depth neural network based on the eight-direction features and the writing order feature.

8. The method of claim 7, wherein extracting the eight-direction features of the spatial trajectory comprises:
   resampling the spatial trajectory using a curve fitting method; and
   extracting the eight-direction features based on the resampled spatial trajectory.

9. An electronic device comprising:
   one or more processors; and
   a storage apparatus for storing one or more programs, wherein the one or more programs when executed by the one or more processors cause the electronic device to perform operations, the operations comprising:
   detecting a palm area of a user in a two-dimensional gray-scale image;
   detecting a fingertip in the two-dimensional gray-scale image based on the palm area;
   determining a spatial trajectory of the fingertip based on a set of two-dimensional gray-scale images, the set of two-dimensional gray-scale images including the two-dimensional gray-scale image; and
   recognizing handwritten content of the user based on the spatial trajectory,
   wherein the two-dimensional gray-scale image is a first gray-scale image, the set of two-dimensional gray-scale images further comprises a second gray-scale image temporally following the first gray-scale image, and
   the determining a spatial trajectory of the fingertip comprises:
   tracking in a search area, determined for regressing a palm frame based on the detected fingertip, in the second gray-scale image, for determining whether the search area comprises the palm, so as to determine the spatial trajectory of the fingertip.

10. The electronic device of claim 9, wherein the detecting a palm area of a user in a two-dimensional gray scale image comprises:
    acquiring a two-dimensional color image through a camera of an electronic device; and
    generating the two-dimensional gray image by graying the two-dimensional color image.

11. The electronic device of claim 9, wherein the detecting a fingertip in the two-dimensional gray scale image comprises:
    detecting a fingertip in the two-dimensional gray-scale image using a depth neural network, the depth neural network being trained using information of consecutive image frames.

12. The electronic device of claim 9, wherein determining the spatial trajectory of the fingertip further comprises:
    determining a current position of the fingertip based on the search area in response to determining that the search area comprises the palm; and
    performing palm detection in the second gray image in response to determining that the search area does not comprise the palm.

13. The electronic device of claim 9, wherein the operations further comprise:
    recognizing a gesture type of the user in response to detecting a hand of the user in a first color image acquired by a camera, the gesture type including at least a start gesture for triggering the aerial handwriting and an end gesture for exiting the aerial handwriting.

14. The electronic device of claim 13, wherein the recognizing a gesture type of the user comprises:
    determining an enclosure area for regressing the hand based on the detected hand;
    determining the gesture type of the user based on the enclosure area in response to finding the hand by tracking in the enclosure area in a second color image following the first color image; and
    performing hand detection in the second color image in response to not finding the hand by tracking in the enclosure area in the second color image.

15. The electronic device of claim 9, wherein the recognizing the handwritten content of the user comprises:
    extracting eight-direction features and a writing order feature of the spatial trajectory; and
    determining a handwritten Chinese character of the user using a depth neural network based on the eight-direction features and the writing order feature.

16. The electronic device of claim 15, wherein extracting the eight-direction features of the spatial trajectory comprises:
    resampling the spatial trajectory using a curve fitting method; and
    extracting the eight-direction features based on the resampled spatial trajectory.

17. A non-transitory computer readable storage medium storing a computer program, wherein the computer program, when executed by a processor, causes the processor to perform operations, the operations comprising:
    detecting a palm area of a user in a two-dimensional gray-scale image;
    detecting a fingertip in the two-dimensional gray-scale image based on the palm area;
    determining a spatial trajectory of the fingertip based on a set of two-dimensional gray-scale images, the set of two-dimensional gray-scale images including the two-dimensional gray-scale image; and
    recognizing handwritten content of the user based on the spatial trajectory,
    wherein the two-dimensional gray-scale image is a first gray-scale image, the set of two-dimensional gray-scale images further comprises a second gray-scale image temporally following the first gray-scale image, and
    the determining a spatial trajectory of the fingertip comprises:
    tracking in a search area, determined for regressing a palm frame based on the detected fingertip, in the second gray-scale image, for determining whether the search area comprises the palm, so as to determine the spatial trajectory of the fingertip.

* * * * *